United States Patent [19]

Smith et al.

[11] Patent Number: 4,678,219
[45] Date of Patent: Jul. 7, 1987

[54] HELICOPTER CARGO HOOK

[75] Inventors: Donald E. Smith, Delphos; Greg A. Haunhorst, VanWert, both of Ohio

[73] Assignee: Aeroquip Corporation, Jackson, Mich.

[21] Appl. No.: 863,059

[22] Filed: May 14, 1986

[51] Int. Cl.$^4$ ............................................... B66C 1/34
[52] U.S. Cl. .................................................... 294/82.33
[58] Field of Search ............... 294/82.33, 82.24, 82.27, 294/82.26, 82.3, 82.31, 82.32, 82.34, 88, 75, 103.1, 104, 66.1, 82.28; 24/232 R, 233, 234, 235, 241 P, 241 PP, 241 R

[56] References Cited

U.S. PATENT DOCUMENTS

| | | | |
|---|---|---|---|
| 3,575,459 | 4/1971 | Coblenz | 294/82.33 |
| 3,630,562 | 12/1971 | Metz | 294/82.33 |
| 3,926,467 | 12/1975 | Crissy et al. | 294/83 R |

Primary Examiner—James B. Marbert
Attorney, Agent, or Firm—Beaman & Beaman

[57] ABSTRACT

A releasable self-resetting cargo hook for helicopters and other aircraft for supporting suspended loads. The cargo hook apparatus includes a pivotally supported load arm maintained in its load supporting condition by a pivotally mounted latch arm whose position, in turn, is controlled by a pivotally mounted latch. The position of the latch is determined by a pivotally mounted lock arm lever whose normal position is determined by a stop pin and which is operated by a release mechanism. The interconnection between the latch and lock arm lever is through a cam slot defined on the latch receiving a lock arm lever follower, and the cam slot-follower relationship prevents impact forces imposed on the cargo hook structure from inadvertently producing lock arm lever rotation and latch movement.

4 Claims, 5 Drawing Figures

HELICOPTER CARGO HOOK

BACKGROUND OF THE INVENTION

Cargo hooks for aircraft, such as helicopters, must be dependable in operation, of relatively concise size and low weight, capable of being operated by relatively low releasing forces even while carrying loads in excess of 10,000 pounds, and although utilizing engaging abutments and wear surfaces upon which the load is imposed, such surfaces must not unduly become worn or misshapen even though high unit pressures may be imposed thereon during cargo release.

A self-resetting aircraft cargo hook meeting the aforementioned prerequisites and operating characteristics is shown in the assignee's U.S. Pat. No. 3,926,467. The aircraft cargo hook therein described utilizes a plurality of pivotally mounted levers and latches to control the position of a load bearing arm, and by employing a pivotally mounted latch positioned by a cam slot and cam follower arrangement, and utilizing a roller for engaging a latch arm, the force necessary to release the load is minimized, yet dependable operation is achieved in a concise configuration.

However, with the assignee's aircraft cargo hook structure shown in U.S. Pat. No. 3,926,467 the engagement of various interrelated components permits impact forces to be transmitted therebetween, and the position of various components may be inadvertently altered upon an exterior impact force being applied to the cargo hook structure, which, under extreme conditions, may permit inadvertent release of suspended cargo.

It is an object of the invention to provide a self-resetting aircraft cargo hook capable of supporting heavy suspended loads wherein the hook components are so positioned under load carrying conditions as to resist the transfer of impact forces between engaged components.

A further object of the invention is to provide a releasable self-resetting aircraft cargo hook having low release forces, yet wherein the locking mechanism for the load bearing arm even though operable by low releasing forces will not be inadvertently actuated by impact forces imposed upon the cargo hook structure and the transfer of impact forces between critical latching components is prevented.

Yet a further object of the invention is to provide a self-resetting aircraft hook utilizing a pivoted latch having low release force operating characteristics and utilizing a cam slot receiving a cam follower mounted on a lock arm lever wherein the relationship between the cam slot and follower is such that impact forces applied to the latch will not be imposed upon the cam follower.

In the practice of the invention the basic components of the aircraft cargo hook are located between a pair of spaced plates which are suspended, by appropriate structure, from the underside of an aircraft. Between the spaced plates a load arm is pivotally mounted having abutments which selectively cooperate with abutments defined on a pivoted latch arm, and the position of the latch arm is regulated by a pivotally mounted latch having a roller selectively engagable with the latch arm for holding the latch arm in the position permitting the latch arm to maintain the load arm in a cargo carrying position. The position of the latch is controlled by a lock arm lever pivotally mounted between the plates and the lock arm lever includes a cam follower received within a cam slot defined within the latch wherein pivoting of the lock arm lever will position the latch relative to the latch arm.

The load arm is counterweighted so that, in a free state, it tends to pivot toward the load carrying position and is "self-resetting". Accordingly, after release of the load, the load arm rebounds from a resilient bumper and pivots to the load carrying position which automatically repositions the latch arm permitting the latch to return to a latch arm restraining position resetting the cargo hook for the next cycle of use.

The cam slot defined in the latch is of such a configuration that its association with the lock arm lever follower permits the follower to pivot the latch when the lock arm lever is pivoted by its actuating mechanism. The follower, when the load arm is in a load carrying position, maintains the latch in such a position that the pivot points and force points on the latch are substantially aligned so that forces imposed on the latch during load carrying may be easily resisted to prevent pivoting of the latch. However, when the lock arm lever is pivoted to release the latch, the forces imposed upon the latch by the latch arm aid in movement of the latch in a releasing direction, and the lock arm lever and latch arm hold the latch in an inoperative position during load release.

A fixed abutment, in the form of a pin, is mounted upon the cargo hook plates and engages the lock arm lever to accurately position the lock arm lever in its normal or load carrying position. This normal position of the lock arm lever locates the cam follower within the latch cam slot in spaced relationship to the ends of the cam slot which prevents impact forces imposed upon the latch from being transferred to the cam follower to cause an inadvertent and undesired pivoting of the lock arm lever in the load releasing direction. Accordingly, the cargo hook in accord with the invention is immune to unintentional release due to impact forces being applied against the cargo hook structure.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
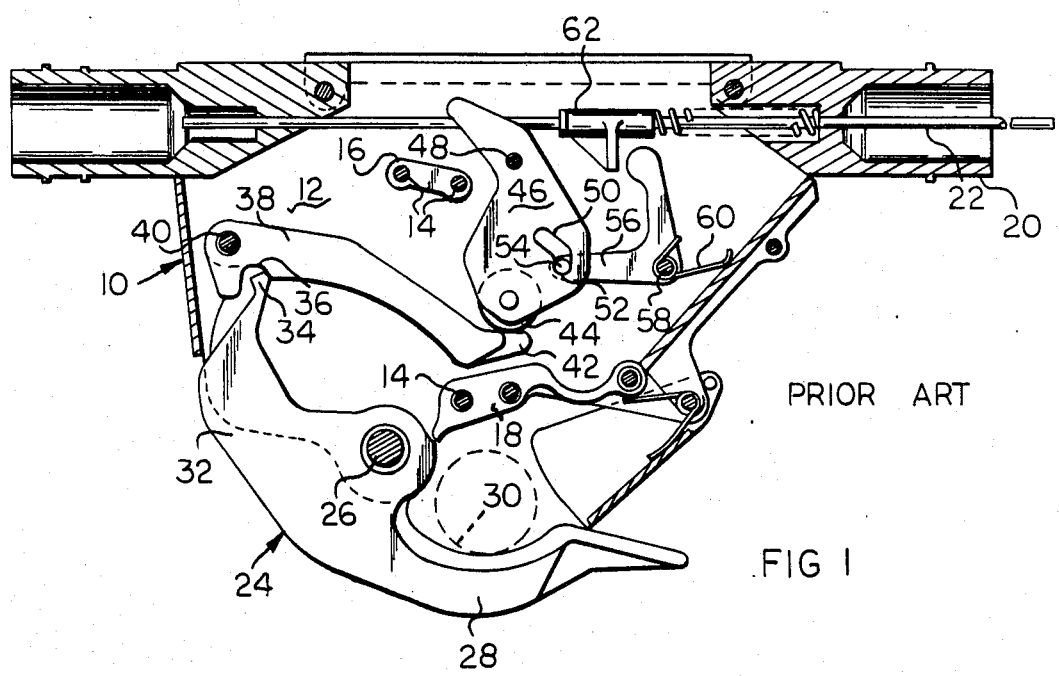
FIG. 1 is an elevational, sectional view of a self-resetting cargo hook in accord with the prior art, namely U.S. Pat. No. 3,926,467, illustrating the load arm in the closed load-supporting position.

The invention is an improvement over the aircraft cargo hook shown in the assignee's U.S. Pat. No. 3,926,467, and this prior art device is shown in FIG. 1, and its basic operation is described below. A more detailed understanding of the operation of the prior art cargo hook will be apparent from a study of the patent itself.

The hook structure includes a housing 10 which basically consists of a pair of parallel spaced side plates 12, one of which is visible, having end walls. Spacer bolts 14 extend between the housing plates and synthetic elastomer bumpers 16 and 18 are held in position by the spacer bolts. The hook housing is supported by cylindrical extensions 20 received within adapters mounted upon the aircraft, not shown, and a manual release rod 22 is axially slidable within the extensions.

The load is carried by the load arm 24 pivotally mounted upon pivot pin 26 and the load arm includes the load bearing portion 28 upon which a load ring 30, shown in dotted lines, may be received. The load arm also includes a weighted portion 32 causing the load arm to pivot in a counterclockwise direction under normal conditions. The load arm is provided with an extension 34 which forms abutment surfaces for engaging with the surfaces of the notch 36 defined in the latch arm 38.

The latch arm 38 is pivotally supported between the housing plates on pivot pin 40 and includes a free end 42 selectively engagable with the roller 44 rotatably mounted upon the pivotally mounted latch 46 which pivots about pivot pin 48. The latch 46 includes a cam slot 50 having a lower portion terminating in the lower end 52, and the cam slot receives a follower 54 located upon the lock arm lever 56 pivotally supported upon the shaft 58 and biased in a counterclockwise direction by torsion spring 60. The lock arm lever 56 may be pivoted in a clockwise direction by engagement with a push plate 62 mounted upon the release rod 22.

With the components shown in the position of FIG. 1 of the prior art cargo hook, clockwise forces imposed upon the load arm 24 by the load ring 30 are resisted by engagement of the load arm extension 34 with the notch 36 within latch arm 38. This engagement between the load arm and latch arm tends to rotate the latch arm in a counterclockwise direction, but such rotation is resisted by engagement of the latch roller 44 with the latch arm free end 42, and the load may be transported as desired.

To release the load, the release rod 22 is translated to the right causing the lock arm lever 56 to pivot in a clockwise direction which raises the cam follower 54 within cam slot 50 engaging the follower with the oblique slot portion causing a counterclockwise rotation of the latch 46. This rotation of the latch removes the roller 44 from the free end of the latch arm 38 permitting the latch arm to pivot counterclockwise into engagement with the bumper 16 releasing the load arm extension 34 from the latch arm notch 36 permitting the load arm to pivot in a clockwise direction and release the load ring 30.

Resetting of the load arm 30 is produced by the rebounding of the load arm from engagement with the bumper 18, and the presence of the load arm counterweighted portion 32 and the counterclockwise load arm movement causes an engaging of the extension 34 with the latch arm notch 36 pivoting the latch arm 38 in a clockwise direction therein permitting the latch 46 to pivot clockwise to locate the roller 44 above the free end of the latch arm and positioning the components for another load carrying cycle.

In this prior art cargo hook, counterclockwise rotation of the lock arm lever 56 under influence of the torsion spring 60 is terminated by engagement of the follower 54 with the lower end 52 of the latch cam slot 50. This direct engagement of the cam follower with the lower end of the cam slot permits impact forces imposed on the latch to be directly transferred to the cam follower and lock arm lever, and if such impact forces are of sufficient magnitude they may overcome the biasing force of the spring 60 permitting the cam follower 54 to rise in the cam slot 50 which would cause a counterclockwise pivoting of the latch, and permit release of the load arm. While such impact forces as to produce inadvertent load arm release must be of a high magnitude, and be directed in a predetermined direction, the possibility of such occurrence exists, and the cargo hook construction of the invention eliminates such a possibility.

A self-resetting aircraft cargo hook in accord with the invention is shown in FIGS. 2–5. A number of improvements exist in the cargo hook of the instant invention over the prior art device, and while many of the components are functionally similar to those previously described of the prior art hook, the configuration of such components differ and the hook of the invention is more concise and more easily constructed than the prior art hook.

The hook housing 64 is defined by a pair of parallel spaced plates 66, one of which is shown, and the plates include end walls 68. The plates are maintained in spaced parallel relationship by spacer bolts 70 which extend through the upper synthetic elastomer bumper 72 and the lower synthetic elastomer bumper 74. The hook housing is supported from hanger structure, not shown, by a pair of bolts 76, FIG. 2, and the hanger structure will be affixed to the aircraft, not shown.

Figure 2:
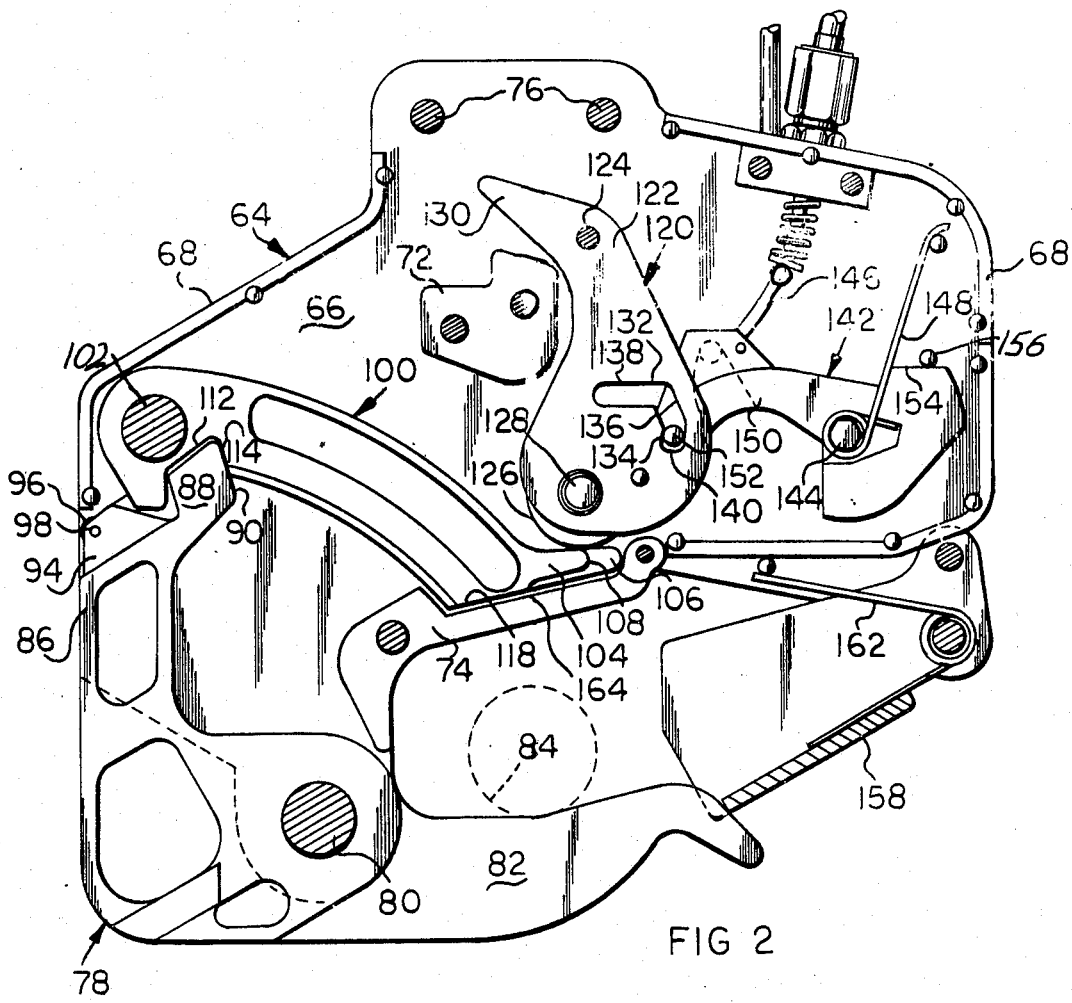
FIG. 2 is an elevational, sectional view of a cargo hook in accord with the invention illustrating the load arm in the closed load-supporting position.
Figure 3:
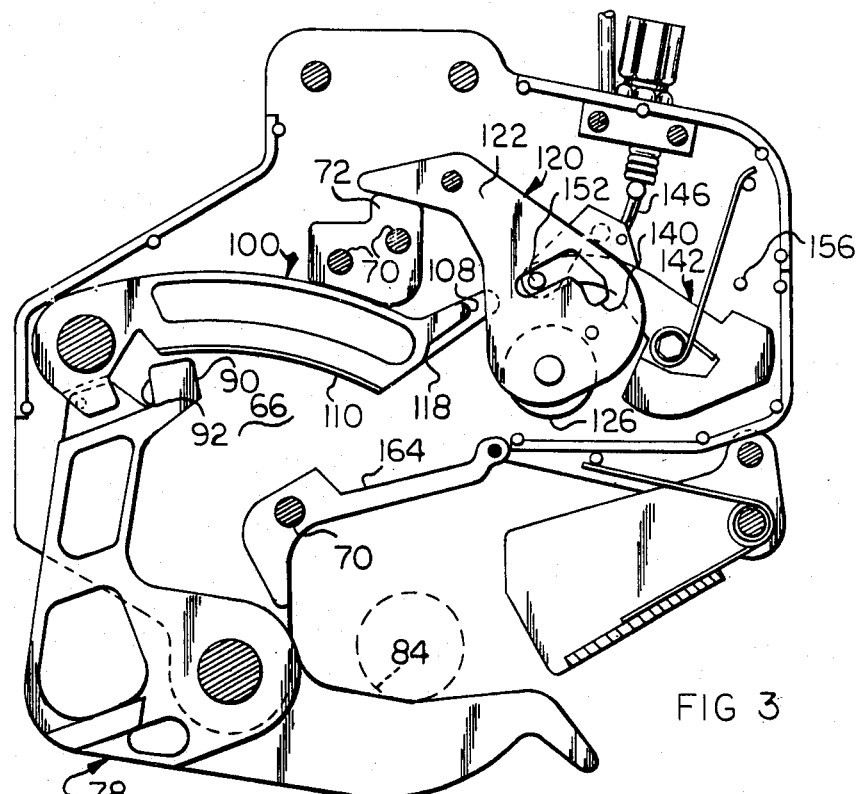
FIG. 3 is an elevational, sectional view of a cargo hook in accord with the invention illustrating the components during load arm opening and immediately after disengagement of the load arm and latch arm abutment surfaces.

The load arm 78 is pivotally mounted upon the pivot pin 80 interposed between the support plates 66, and the load arm portion 82 is shaped to receive the cargo load ring 84, shown in dotted lines, in FIGS. 2 and 3. The load arm 78 includes a counterweighted portion 86 having extension 88 upon which abutment surfaces 90 and 92 are defined. The extension also includes a web 94 upon which the roller 96 is rotatably mounted upon axle 98. The weight distribution of the load arm 78 is such that the load arm tends to rotate in the counterclockwise direction under normal no-load conditions.

The latch arm 100 is pivotally mounted upon the pivot pin 102 and includes a free end 104 defined by the web 106 and the outer portions 108, which together, form a substantially flat upper surface for receiving the latch roller, as later described. The underside of the latch arm 100 is formed with an arcuate concave surface 110 and the latch notch 112 is formed with abutment surfaces 114 and 116, the notch being of a configuration as to readily receive the load arm extension 88.

As will be appreciated from FIG. 2, the free end 104 of the latch arm is provided with the linear bottom surface 118 which conforms to the adjacent configuration of the bumper 74.

Figure 4:
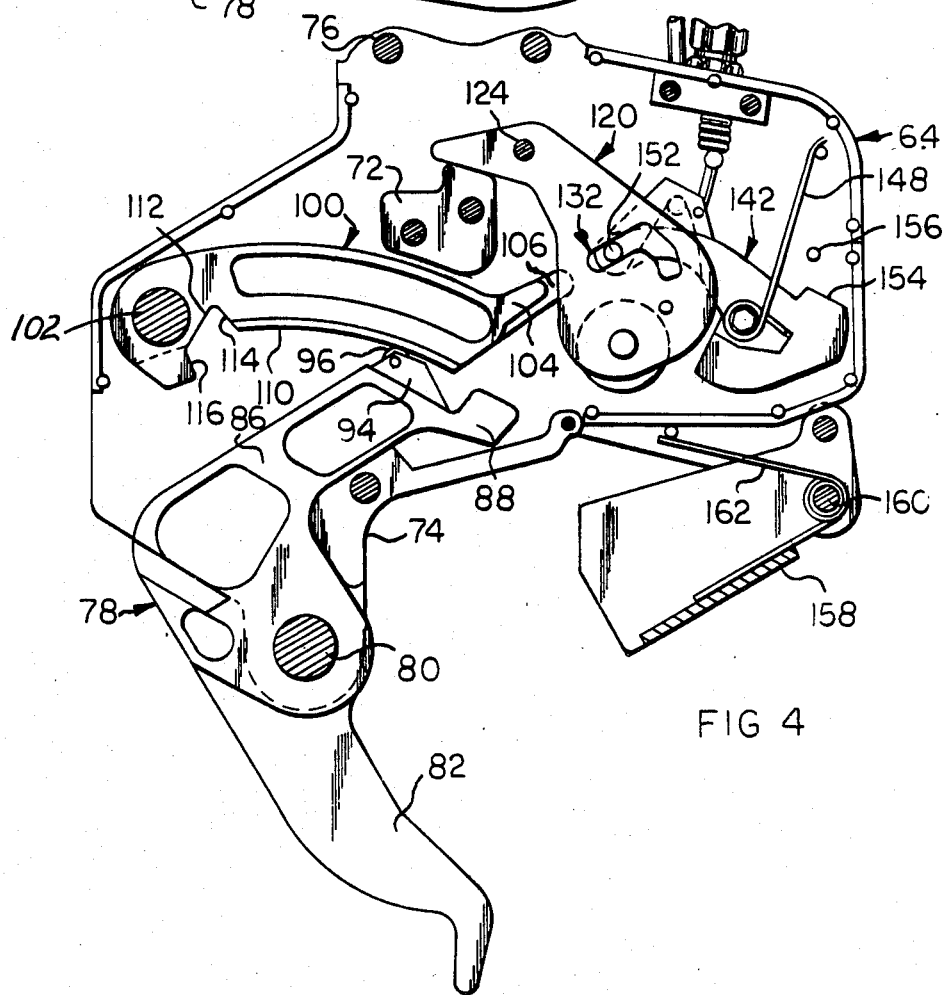
FIG. 4 is an elevational, sectional view of the cargo hook illustrating the components with the load arm fully open, and, FIG. 5 is an elevational, sectional view of the cargo hook illustrating the components at the position terminating the resetting of the load arm with the latch arm in engagement with the bumper and prior to the latch arm engaging the latch roller.

The latch 120 is formed of a pair of spaced plates 122 in the manner similar to the construction of the latch of the previously described prior art cargo hook, and the latch is pivotally mounted on the housing 64 by the pivot pin 124. At its lower portion, the latch includes a roller 126 rotatably mounted between the latch plates 122 on axle 128, and at its upper region the latch includes an extension 130 adapted to engage the bumper 72, as shown in FIGS. 3 and 4, during the release cycle.

The latch 120 includes a cam slot 132 consisting of a lower portion 134, an intermediate portion 136 and an upper portion 138, and these three portions of the cam slot are angularly related to each other as will be apparent. The lower end of the portion 134 is defined by a relatively "squared" end 140.

Positioning of the latch 120 is produced by the lock arm lever 142 pivotally mounted upon the hook housing between the plates 66 on a shaft 144. The pivot shaft 144 may be rotated by a symmetric knob, not shown, exteriorly located of the housing plates, for manual direct operation. Also, the lock arm lever 142 may be pivoted in a clockwise direction remotely by means of a cable system generally indicated at 146. Also, it is to be appreciated that other known actuating devices may be used to pivot the lock arm lever in a direction to release the load.

The lock arm lever 142 is biased in a counterclockwise direction by the torsion spring 148, and the spring 148 is of sufficient strength to overcome any frictional resistance in the remote cable release system 146, or associated release structure, during resetting.

The lock arm lever 142 includes an extension 150 which is received between the plates of the latch 120 and a cylindrical cam follower 152 mounted on the extension is located within the latch cam slot 132. Additionally, the lock arm lever 142 includes an abutment surface 154 located to the right of the pivot shaft 144, FIG. 2, for engagement with the fixed stop pin 156 which extends between the housing plates 66.

Under normal conditions, as shown in FIG. 2, the lock arm lever 142 will be pivoted to its maximum extent in a counterclockwise direction by the torsion spring 148, and pivotal movement of the lock arm lever is terminated by engagement of the abutment surface 154 with the stop pin 156. Such positioning of the lock arm lever by the stop pin locates the cam follower 152 within the slot portion 134 and in spaced relationship to and above the cam slot lower end 140. As the cam slot portion 134 is substantially vertically disposed, the reception of the follower 152 within the portion 134 will accurately position the latch 120 with respect to the latch arm 100 and prevent rotation of the latch in either direction about its pivot pin 124. Preferably, the location of the cam follower 152 and cam slot portion 134 is such that when the hook is carrying a load the center of the roller axle 128 will be slightly to the right of the latch pivot pin 124, FIG. 2, which will aid in minimizing the force necessary to pivot the latch 120 in the counterclockwise direction during load release, but this deviation from an "on-center" relationship of the point of engagement of the roller 126 with the latch arm 100, the roller axle 128 and the pivot pin 124 is slight, and no excessive forces are being imposed upon the latch tending to rotate the latch in a counterclockwise direction during load carrying.

As the lock arm lever 142 is rotated in a clockwise direction, the cam follower 152 engages the cam slot portion 136 pivoting the latch 120 counterclockwise and the cam follower will enter the cam slot portion 138 during full release as shown in FIGS. 3 and 4.

The load ring 84 is held within the throat of the load arm 78 by a retainer 158 pivotally mounted on pin 160 and biased in a counterclockwise direction by the torsion spring 162. In this manner the retainer may be pivoted upwardly out of the way when placing the load ring 84 on the load arm, and will snap downwardly to prevent the load ring from sliding from the load arm until the load arm pivots to its open position.

With the components in the relationship shown in FIG. 2 the load ring 84 may be placed upon the load arm portion 82 by forcing the retainer 158 upwardly. As the load is applied to the load arm 78, the tendency to produce a clockwise rotation in the load arm engages surfaces 90 and 114. This produces a tendency to rotate the latch arm 100 counterclockwise, and this movement is resisted by engagement of the latch roller 126 with the free end 104 of the latch arm, and the load suspended from the load ring may be transported as desired.

To release the load ring 84 from the load arm 78, the lock arm lever 142 is rotated in a clockwise direction, such as by the release cable system 146, and as previously described, this lock arm lever movement will pivot the latch 120 counterclockwise due to the interrelationship of the cam follower 152 and the cam slot 132, and move the latch roller 126 from engagement with the free end 104 of the latch arm 100.

As the latch roller 126 rolls over the end of the latch arm web 106, the latch arm 100 will very quickly rotate counterclockwise releasing engagement of the surfaces 90 and 114 and the latch arm will engage bumper 72 as shown in FIG. 3. This disengagement of the abutment surfaces 90 and 114 permits the load arm 78 to rotate clockwise to the fully open position shown in FIG. 4 releasing the load ring 84.

As the load arm rotates from the position of FIG. 3 to that of FIG. 4 the latch arm 100 will rebound from the bumper 72 but engagement of the load arm roller 96 with the underside surface 110 of the latch arm will hold the latch arm in the elevated position of FIG. 4. Simultaneously, as the latch arm web 106 has entered between the plates 122 of the latch 120, the latch arm portions 108 will maintain the latch in its counterclockwise rotated position. When the load arm 78 is fully opened, the complementary surfaces on the counterweighted portion 86 and the bumper 74 will engage, FIG. 4, imparting a rebounding movement to the load arm.

After release and during rebound, the load arm 78 will rotate counterclockwise causing the abutment surface 92 to engage the latch arm abutment surface 116 and pivot the latch arm 100 clockwise until its surface 118 engages the bumper surface 164, as shown in FIG. 5. This relationship will permit the latch 120 to pivot in a clockwise direction over the free end of the latch arm under the influence of spring 148 pivoting lock arm lever 142 counterclockwise locating the latch roller 126 over the free end 104.

As soon as the load ring is again applied to the load arm 78 producing a slight clockwise rotation of the load arm, the latch arm 100 will be lifted as surfaces 90 and 114 engage so that its free end engages the latch roller as shown in FIG. 2, and the cycle may be repeated as described above.

As the stop pin 156 will prevent engagement of the cam follower 152 with the lower end 140 of the cam slot 132 impact forces applied to the cargo hook housing, or the cargo hook itself, will not be transferred from the latch to the cam follower and lock arm lever which might tend to rotate the lock arm lever 142 in a clockwise direction displacing the latch 120 and permitting load release. Thus, whether impact forces are exteriorly applied to the cargo hook housing or may be applied to the load arm by the load ring, the use of the stop pin 156 isolates the cam follower from the end of the cam slot preventing the transfer of impact forces therebetween.

It is appreciated that various modifications to the inventive concepts may be apparent to those skilled in the art without departing from the spirit and scope of the invention.

We claim:

1. In a cargo hook including a support, a load arm pivotally mounted on the support pivotal about an axis between a closed load supporting position and an open load releasing position, a first abutment surface defined on the load arm radially spaced from the arm pivot axis, a latch arm pivotally mounted on one end on the support on an axis parallel to the load arm axis and having a free end, a second abutment surface defined on the latch arm adjacent the pivotally mounted end thereof, said latch and load arms having a coincident plane of operative movement, the latch arm being pivoted between a first position whereby the first abutment engages the second abutment preventing pivoting of the load arm from the closed load supporting position to the open load releasing position, and a second position disengaging the first and second abutments permitting the load arm to pivot to the open position, a latch pivotally mounted on the support on an axis substantially parallel to the load arm axis engagable with the latch arm free end at a first latch position maintaining the latch arm in the first position thereof and releasing the latch arm at a second latch position for permitting movement of the latch arm to its second position, a cam slot defined in the latch having an end, a lock arm lever pivotally mounted upon the support pivotal about an axis substantially parallel to the latch pivot axis, a cam slot follower mounted upon the lock arm lever received within the latch cam slot, pivotal movement of the lock arm lever in a first direction pivoting the latch toward its first position and pivotal movement of the lock arm lever in a second direction pivoting the latch toward its second position, and operating means connected to the lock arm lever for pivoting the lock arm lever about its pivot axis to translate the cam follower within the cam slot and pivot the latch between its first and second positions, the improvement comprising, stop means mounted on the support engaging the lock arm lever when pivoting in its first direction to locate the cam follower in spaced relationship to the cam slot end when the latch is in its first position.

2. In a cargo hook as in claim 1, said stop means comprising a fixed abutment defined upon the support engagable with the lock arm lever at a location radially spaced from the lock arm lever pivot axis when the lock arm lever is pivoted to its greatest extent in its first position.

3. In a cargo hook as in claim 2, said stop means fixed abutment comprising a pin mounted in the support extending into the plane of movement of the lock arm lever.

4. In a cargo hook as in claim 1, an arcuate concave surface defined on the latch arm disposed toward the load arm, and a roller rotatably mounted on the load arm engaging said latch arm arcuate surface during pivoting of the load arm between its load supporting and load releasing positions to support the latch arm when in its second position.

* * * * *